(12) United States Patent
Perez López et al.

(10) Patent No.: US 8,971,592 B2
(45) Date of Patent: Mar. 3, 2015

(54) METHOD FOR DETERMINING EYE LOCATION ON A FRONTAL FACE DIGITAL IMAGE TO VALIDATE THE FRONTAL FACE AND DETERMINE POINTS OF REFERENCE

(71) Applicant: Universidad de Chile, Santiago, Región Metropolitana (CL)

(72) Inventors: Claudio Andrés Perez López, Región Metropolitana (CL); Pablo Antonio Estévez Valencia, Región Metropolitana (CL); Javier Ruiz Del Solar San Martin, Región Metropolitana (CL); Claudio Maracelo Held Barrandeguy, Región Metropolitana (CL); Carlos Mercelo Aravena Cereceda, Región Metropolitana (CL)

(73) Assignee: Universidad de Chile (CL)

( * ) Notice: Subject to any disclaimer, the term of this patent is extended or adjusted under 35 U.S.C. 154(b) by 96 days.

(21) Appl. No.: 13/890,710

(22) Filed: May 9, 2013

(65) Prior Publication Data

US 2014/0334694 A1   Nov. 13, 2014

(51) Int. Cl.
*G06K 9/00*   (2006.01)
(52) U.S. Cl.
CPC .................................. *G06K 9/00617* (2013.01)
USPC ........... 382/118; 382/103; 382/164; 382/173; 382/181; 382/190; 382/218; 382/224; 382/254
(58) Field of Classification Search
CPC .......... G06K 9/00228; G06K 9/00234; G06K 9/00261
USPC ......... 382/103, 115–118, 164, 173, 181, 190, 382/218, 224, 254
See application file for complete search history.

(56) References Cited

U.S. PATENT DOCUMENTS

2007/0031033 A1*   2/2007   Oh et al. ...................... 382/167
2012/0062761 A1*   3/2012   Ianculescu et al. ........ 348/222.1

OTHER PUBLICATIONS

Perez et al. "Real-Time Iris Detection on Coronal-Axis-Rotated Faces." *IEEE Transactions on Systems, Man & Cybernetics.* (2007) 37(5):971-978.
Viola. "Robust Real-Time Face Detection." *International J. of Computer Vision.* (2004) 52(2):137-154.
Campadelli et al. "Eye localization: a survey." *Fundamentals of Verbal & Nonverbal Comm the Biometric Issue.* 2007. pp. 234-245.

* cited by examiner

*Primary Examiner* — Mike Rahmjoo
(74) *Attorney, Agent, or Firm* — Merchant & Gould P.C.

(57) ABSTRACT

A method is described for determining eye location on a frontal face digital image in order to validate the frontal face as such and determine points of reference. The method consists of the following steps: obtain a frontal face digital image that is W pixels wide and H pixels high in grayscale, where the top left vertex of the digital image is considered to be the reference source; detect each eye, starting from a search subimage of the frontal face digital image, delivering approximate coordinates if both eyes have been detected, or an arbitrary predetermined value to indicate no eye detection; locate the iris of each eye, if both eyes have been detected, starting from the approximate coordinates, validating the frontal face digital image by delivering eye positions; or, validate the frontal face digital image if one or both eyes have not been detected by submitting a search subimage defined by an area resulting from centering a square of area L in the original image, where L=0.8×W, delivering coordinates for the eyes.

6 Claims, 5 Drawing Sheets

METHOD FOR DETERMINING EYE LOCATION ON A FRONTAL FACE DIGITAL IMAGE TO VALIDATE THE FRONTAL FACE AND DETERMINE POINTS OF REFERENCE

FIELD OF APPLICATION

This invention is a face identification tool that uses biometric parameter evaluation. More specifically, it is a method to determine eye location on a frontal face within a digital image and thereby validate if the image is a face.

BACKGROUND OF THE INVENTION

In the field of digital image processing, the ability to robustly and precisely locate eye position in frontal facial images is of great importance for various biometric applications, including human-machine interfaces, remote control of equipment, and fatigue detection, among others. The search for the position of the iris within the face is a particularly crucial prior step for face recognition applications. In Campadelli P., Lanzarotti R., Lipori G., "Eye localization: A survey. The fundamentals of verbal and nonverbal communication and their biometrical issues", NATO Sci. Series, Vol 18, 2007, pp. 234-245, it is demonstrated that a 5% error in center eye position (relative to the distance between the eyes) results in a 20% drop in the face recognition rate for different methods studied. This is why robust, precise, and computationally efficient methods for estimating center eye position are so important.

It has been demonstrated that different methods for locating eyes, and the iris in particular, are successful in specific applications. However, these methods are of limited use because they are invasive, or partially invasive, requiring helmet-mounted devices, use of electrodes to measure eyeball activity, use of near-infrared light to detect the pupil reflections, or cameras positioned very near to the eye.

In the case of non-invasive methods based on digital image processing, the majority of the techniques focus on progressively more complex detections or validations, whereby they first approximate eye position and then refine those estimates in a later step. Other models obtain eye position by detecting other facial features, such as the nose or mouth; this eliminates false detections by choosing those pairs of eye candidates, which meet certain statistical criteria related to their relative position with respect to other facial features.

Among the non-invasive methods, the main limitations are: the use of very high resolution images in the eye region, which requires highly controlled lighting and contrast conditions, or the requirement of open eyes for proper detection. Other methods requiring the detection of alternate facial characteristics, such as the nose and/or mouth and others produce high numbers of false positives within the face. The use of eyeglasses is problematic for those methods that are not robust to reflections, and the use of sunglasses prevents the proper functioning of the great majority of the methods, which are unable to estimate eye location.

Many of these methods assume that there has been prior facial detection, but they are not capable of discerning whether the input image is a validly detected face or not. Finally, some of these methods are computationally expensive, and thus cannot be used effectively in real-time applications. Therefore, a robust and efficient eye location method, which solves some of these formerly mentioned constraints, is still needed.

The solution proposed here is a non-invasive method of locating eyes within digital images, which delivers an accurate estimate of eye location, and also functions in non-optimal conditions, such as with eyes closed or with occlusions (e.g. sunglasses). Furthermore, this method does not require the detection of other facial features and is capable of validating whether or not the image is a frontal face. Additionally, its computational efficiency allows for real-time application.

SUMMARY OF THE INVENTION

One of the objectives of this invention is to provide a method for determining eye location in a frontal face digital image in order to validate the image as a frontal face and determine points of reference. The method first obtains a grayscale digital image of a supposed frontal face, W pixels wide and H pixels high, where the upper left vertex of the digital image is considered as the original point of reference. Each eye is then detected starting from a sub-image search of the frontal face digital image, providing approximate coordinates if both eyes have been detected thus validating the image as a face, or an arbitrary predetermined value to indicate non-eye detection. The iris of each eye is then located using the approximate coordinates or if one or both eyes have not been detected, calculating a search sub-image bound by an area resulting from the centering of a square of L area, where $L=0.8 \times W$. This latter gives the coordinates for where the eyes should be, where the digital image is frontal with a ±15° within plane, and a ±30° out of plane rotation.

The step of detecting each eye begin by calculating a sub-image for the left eye defined as the area ($W_{left} \times H_{left}$) of the original image between the coordinates $0.5 \times W$ and $0.95 \times W$ pixels on its horizontal side, and between the coordinates $0.05 \times H$ a $0.5 \times H$ pixels on its vertical side. Next a search subimage is determined for the right eye, defined by the area ($W_{right} \times H_{right}$) of the original image bound by the coordinates $0.05 \times W$ and $0.5 \times W$ pixels on its horizontal side, and by coordinates $0.05 \times H$ and $0.5 \times H$ pixels on its vertical side. A normalization factor, $S_{eyes}$, from the width of the search windows, $W_{left}$ and $W_{right}$ and preferably a 200 pixel value, $U_{eyes}$, where $S_{eyes} = \max(W_{left}; W_{right})/U_{eyes}$ is calculated. The sub-images calculated are then resized by the $S_{eyes}$ normalization factor using simple linear interpolation, maintaining the aspect ratio. The search subimages are submitted to a query to detect whether the image contains eyes using an Adaboost cascade classifier with Haar features, previously trained with images of eyes and "not eyes". Either the approximate coordinates for each eye are obtained, or an arbitrary predetermined value is delivered which indicates there is no eye detection, hence the face is not valid. In the case of eye detection, the approximate values are transformed to the original W×H pixels reference system, giving rise to the coordinates ($X'_{left}; Y'_{left}$) and ($X'_{right}; Y'_{right}$), respectively. The normalization factor is applied as:

$$X'_{left} = X_{left} \times S_{eyes} + 0.5 \times W, Y'_{left} = Y_{left} \times S_{eyes} + 0.5 \times H$$

$$X'_{right} = X_{right} \times S_{eyes} + 0.05 \times W, Y'_{right} = Y_{right} \times S_{eyes} + 0.5 \times H,$$

where:
($X'_{left}; Y'_{left}$) are the left eye coordinates relative to the input frontal face image,
($X'_{right}; Y'_{right}$) are the right eye coordinates relative to the input frontal face image,
and ($X_{left}; Y_{left}$) and ($X_{right}; Y_{right}$) are the left and right eye coordinates produced in the cascading eye detection step.

The next step is to refine the position of the eye by locating the iris. To accomplish this a search radius $R_{eyes}$ as a function of the distance between the approximate initial eye positions on the input image is calculated. A search subimage for the left eye whose upper left vertex is located at ($X'_{left}-R_{eyes}$, $Y'_{left}-R_{eyes}$) and the lower right vertex at ($X'_{left}+R_{eyes}$, $Y'_{left}+R_{eyes}$) of the original image is computed. The same procedure is followed for the right eye (search subimage for right eye whose upper left vertex is located at ($X'_{right}-R_{eyes}$, $Y'_{right}-R_{eyes}$) and the lower right vertex at ($X'_{right}+R_{eyes}$, $Y'_{right}+R_{eyes}$) of the original image). Finally the digital image is validated as a frontal face identifying the eye positions through the iris coordinates obtained for each of the eyes ($X_i$, $Y_i$) and ($X_d$, $Y_d$). This latter step of validating the digital image as a frontal face consists of filtering the search subimage $I_{eye}$ using minimum filtering, generating an image $I_{eyem}$, binarizing the filtered image $I_{eyem}$ with the goal of generating a mask subimage containing the candidate coordinates for center of the iris.

Using the non zero pixel values, which are candidates for the center of the iris, an iris template is applied. The template is composed of four arcs, defined by the angular parameters α and β at 50° and 70° respectively and which are obtained by empirical measurements, with a value of one in the arcs and zero in the rest. First, an internal iris template is generated of size 2R×2R, where R is the radius of the arcs and is defined as $$R = 0.11 \times \left(\frac{H/2}{2} - 70\right) + 8.$$

Then, an external iris template is generated as above, whose radius is R+δ, where δ is preferably 2. For each pixel that is an iris center candidate, a line integral value A is computed by centering the internal iris template on the candidate pixel coordinate and adding all pixels coinciding with the arcs of the internal iris template. Next, another line integral value B is computed by adding the pixels whose positions coincide with the arcs of the external iris template centered on the candidate pixel coordinate. Both sums are performed on the original non-filtered search image ($I_{eye}$)). The ratio B/A is computed for all candidate pixels and the highest value is chosen as the center of the iris in the original search subimage.

In the case in which one or both of the eyes are not detected, the input frontal face digital image is validated by calculating a subimage that will be used as an input to an Adaboost cascade classifier. This search subimage subjected to the Adaboost cascade classifier using Haar features will be defined as the area resulting from centering a square of area L on the original image. The Adaboost classifier has been previously trained with images that include both eyes and nose. If the output of the classifier is negative, then the input is rejected as a frontal face. If the output is positive, then the steps are executed for estimating left eye coordinates ($X_i$, $Y_i$) such that $X_i$ is in position 0.21×L pixels and $Y_i$=0.54×L pixels with respect to the frontal face input image. The coordinates for the right eye ($X_d$, $Y_d$) are then estimated such that $X_d$ is in position 0.83×L pixels and $Y_d$=0.54×L pixels with respect to the frontal face input image. Finally the coordinates obtained for each eye ($X_i$, $Y_i$) and ($X_d$, $Y_d$) are delivered.

DETAILED DESCRIPTION OF A PREFERRED EMBODIMENT

The method for determining eye location on a frontal face in a digital image to validate it as a frontal face requires as an initial condition that the digital image of the frontal face be W pixels wide and H pixels high, in grayscale, obtained through various methods. The image could be captured by a digital photo or video camera, by digitizing an analog picture, from a larger image using face detection, or marked manually. The original image can be in color, converted to grayscale using computational methods. The point of origin for the reference system is considered to be the upper left vertex of the image, and the unit of measurement is one pixel. The face has to be frontal with rotations of ±15° within the plane and rotations of ±30° outside of the plane.

Once the image is submitted under the conditions described above, an eye detection step begins which will seek both eyes in a delimited area of the input image. If both eyes are found, the face is considered to be valid, and the eye position is refined for more accuracy with an iris localization step, whose final output is the final position of both eyes. If, as a result of the eye detection step, one or both eyes are not found, the input image is run through the face validation step to determine whether it is a valid face or not. If it is a valid face, eye position is estimated anthropometrically.

Figure 1:
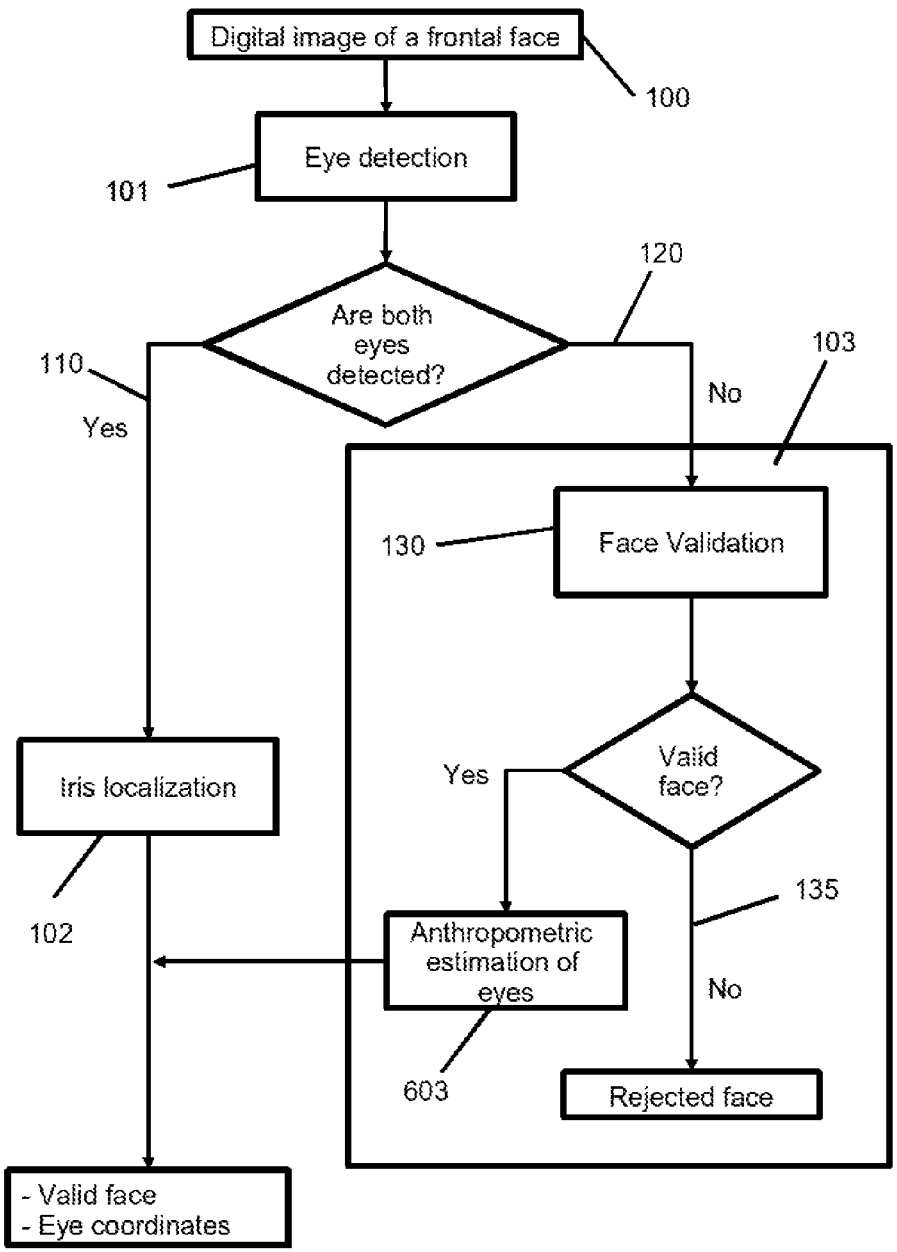
FIG. 1 is a general overview of the method proposed in this invention.

FIG. 1 is a general description of the method. A digital image of the frontal face is obtained (100). This is followed by the eye detection step (101) of the frontal face digital image (100). If both eyes are detected (110), the process moves to an iris localization step (102) to deliver eye position (coordinates), validating the frontal face digital image (100). If both eyes are not detected (120), the frontal face validation step is run (103) to determine whether it is a valid face or not. This step has two sub-steps. The first sub-step is face validation (130) as such. If the face is valid, the digital image of the frontal face (100) moves to the second sub-step for anthropometric estimation of eyes (603). In this sub-step, the approximate coordinates of the left eye and the right eye are calculated and mapped to the original reference system, i.e. the digital image of the original frontal face (100) that is W pixels wide and H pixels high. In the case where the face is rejected (135), no eye coordinates are delivered (face is not valid). This twofold validation on the one hand allows for the rejection of input images that are not valid faces, and on the other, estimates eye positions even in the event of occlusions or closed eyes.

Figure 2:
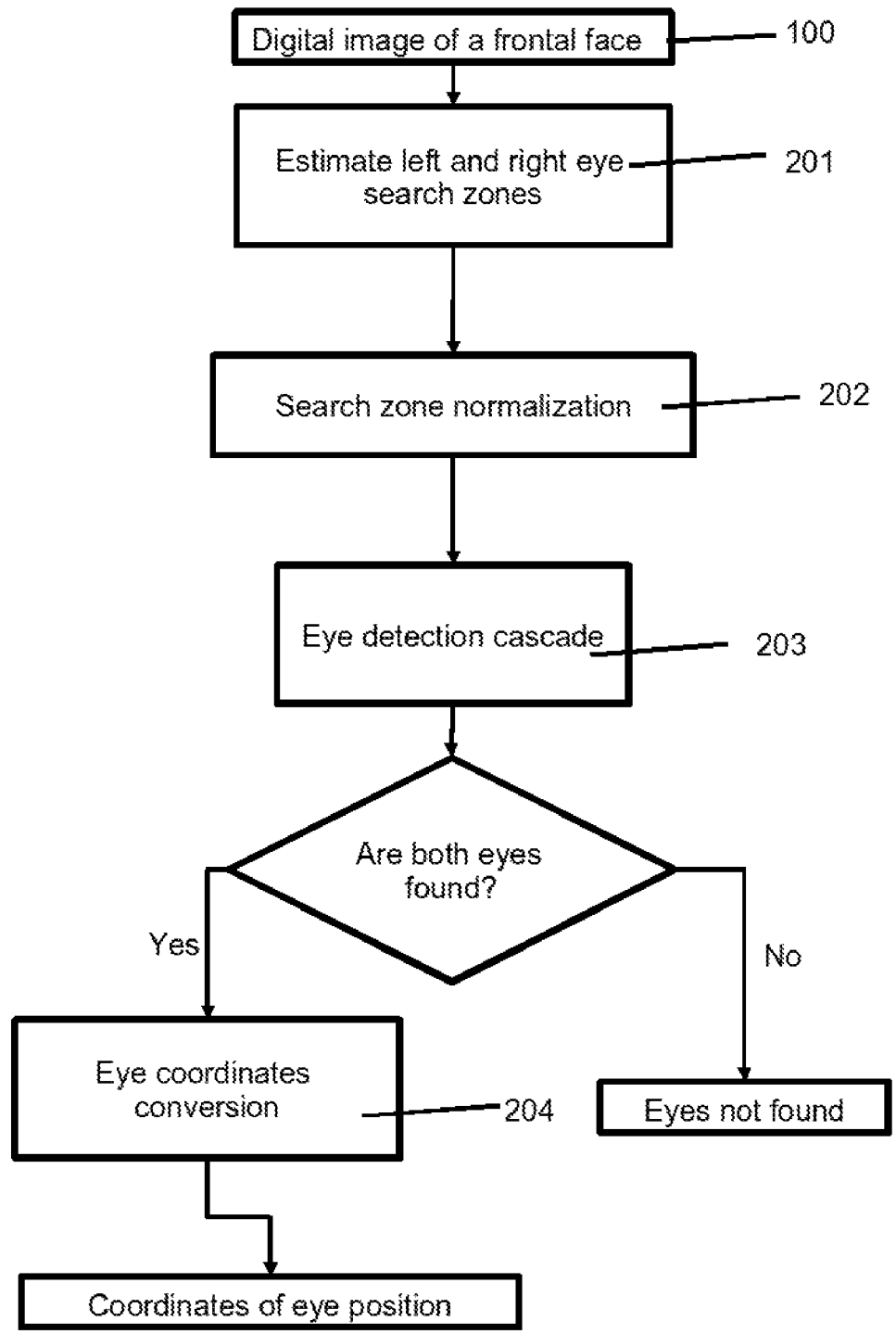
FIG. 2 describes the eye detection step.

The eye detection step (101) described in FIG. 2 starts from the digital image of the frontal face (100) initial input. Two zones are estimated (201), one for the left eye and the other for the right eye. These zones are determined as a function of the sides of the frontal face (100), which correspond to the dimensions of the frontal face digital input image (100) (W pixels wide, H pixels high). The search zones are defined as follows:

Left eye: rectangle ($W_{left} \times H_{left}$) contained between a first range, for example 50% and 90% of the horizontal side of face W, and between a first range, for example 5% and 50% of the vertical side of face H, and Right eye: rectangle ($W_{right} \times H_{right}$) contained between a second range, for example 5% and 50% of the horizontal side of face W, and between a second range, for example 5% and 50% of the vertical side of face H.

These are the parameters considered for the preferred implementation of the method, and they can be modified around these values as part of the same method. After determining the search zone for each of the eyes, these are normalized in step (202) that rescales the digital image of the input face (100) to make the eye detection cascade step efficient (203). The normalization step (202) seeks to obtain a search zone that is smaller than a certain threshold $U_{eyes}$ on its horizontal side. An $S_{eyes}$ normalization factor is determined as:

$$S_{eyes} = \max(W_{left}; W_{right})/U_{eyes}$$

This $S_{eyes}$ normalization factor is applied to both dimensions of the input image. The $U_{eyes}$ value for this preferred implementation is 200 pixels. The normalized search zones are entered, in series or in parallel, to the eye detection cascade sub-step (203), which performs the search for all of the eyes in its respective search zone. The eye detection cascade sub-step (203) responds to an Adaboost cascade classifier using Haar features, previously trained with images of eyes and implemented in a known manner. Other implementations are possible as variations of Adaboost or the use of characteristics different than Haar, such as LBP (Local Binary Patterns).

Following the cascade eye detection sub-step (203), a check is run to verify if both eyes were found, which is to say, if one eye was found for each of the two search zones defined in the search estimation step (201). If one or both eyes were not found, the output of the eye detection step (101) will then be null. If both eyes are found, the coordinates of the eye position obtained for each search zone are transformed through the coordinate conversion step (204), so that they are mapped relative to the frontal face (100) input image. This transformation is executed as follows:

$$X'_{left} = X_{left} \times S_{eyes} + 0.5 \times W$$

$$Y'_{left} = Y_{left} \times S_{eyes} + 0.5 \times H$$

$$X'_{right} = X_{right} \times S_{eyes} + 0.05 \times W$$

$$Y'_{right} = Y_{right} \times S_{eyes} + 0.5 \times H$$

Where:
- $(X'_{left}; Y'_{left})$ are the left eye coordinates relative to the frontal face (100) input image;
- $(X'_{right}; Y'_{right})$ are the right eye coordinates relative to the frontal face (100) input image;
- $(X_{left}; Y_{left})$ and $(X_{right}; Y_{right})$ are the coordinates for the left and right eye delivered by the cascade eye detection substep (203);
- $S_{eyes}$ is the scaling factor delivered by the normalization sub-step (202);
- and W and H are the width and height respectively of the frontal face (100) input image.

Figure 3:
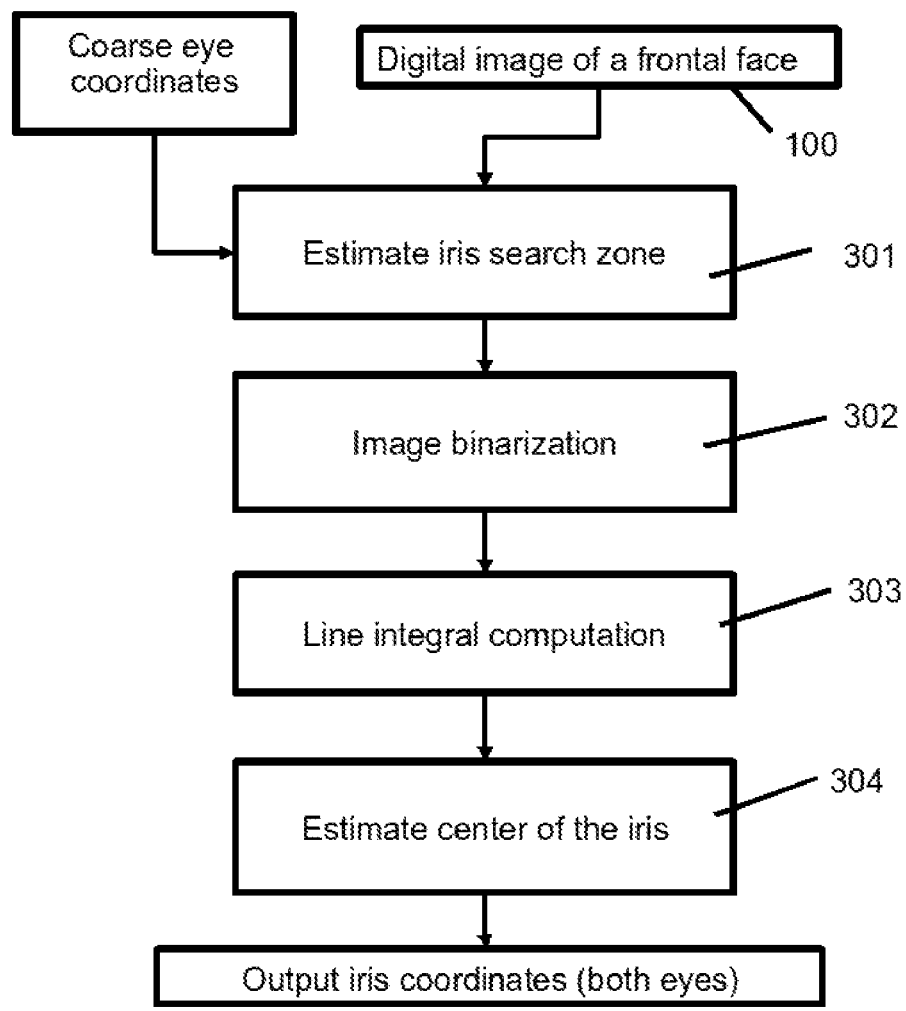
FIG. 3 is a flowchart of the steps in iris location.

If the eye detection step (101) locates both eyes, and therefore validates the digital image of the input face (100), the positions obtained as output from the eye detection step (101) are refined by the iris location step (102). This iris location step (102), is shown in FIG. 3, and is based on the method published in, "Perez C. A.; Lazcano V. A.; Estevez P. A.; *Real-Time Iris Detection on Coronal-Axis-Rotated Faces, IEEE Transactions on Systems, Man, and Cybernetics, Part C: Applications and Reviews*, vol. 37, no. 5, September 2007, pp. 971-978". The iris location step (102) includes the digital image of the input face (100) and the positions of the left and right eyes from the eye detection step (101), followed by a first step estimate of the search zone for each iris (301) using the information about eye position from the digital input image of the face (100). A square search zone for each eye is defined, whose radius $R_{eyes}$ is centered on the eye coordinates delivered by the eye detection step (101). This radius, $R_{eyes}$, is determined as a function of the distance between the eyes on the digital input image of the frontal face (100) in the following relationship:

$$R_{eyes} = 0.2 \times (X'_{left} - X'_{right})/2$$

therefore the search zone for each eye is determined as:
- Left eye: square defined by the upper left vertex in $(X'_{left} - R_{eyes}, Y'_{left} - R_{eyes})$, and the lower right vertex in $(X'_{left} + R_{eyes}, Y'_{left} + R_{eyes})$
- Right eye: square defined by the upper left vertex in $(X'_{right} - R_{eyes}, Y'_{right} - R_{eyes})$, and the lower right vertex in $(X'_{right} + R_{eyes}, Y'_{right} + R_{eyes})$ Once the eye search zone is estimated with the first step of the search zone estimation of each iris (301), a second binarization step of the image (302) is executed within each of the obtained search zones. This seeks to identify possible iris centers, reducing reflections with a minimum filtering, and binarizing by histogram level. The second image binarization step (302) consists of applying a minimum filtering to each of the search zones, of the form:

$$I_{eyem}(i,j) = \min[I_{eye}(i-k, j-l)]k, l \in [-3, 3]$$

where $I_{eyem}$ is the filtered image and $I_{eye}$ is the respective search zone obtained in the iris search zone estimation step (301). This minimal filtering is applied to both the left and right eye search zones. The grayscale image, more homogeneous than the original, is then binarized in order to keep only the darker pixels, which are candidates to belong to the iris:

$$I_{iris} = \begin{cases} 0 I_{eyem} & (i,j) < t \\ 255 & \text{other} \end{cases}$$

The threshold t segments the darkest 35% of the pixels from the cumulative histogram in the preferred implementation. To locate the center iris position, the fact that the iris-sclera boundary offers high contrast and circular symmetry is used. With this, the third step of line integral computation (303) is performed on the arcs defined by the iris templates $TI\_\phi$ that model their approximately circular form.

Figure 4:
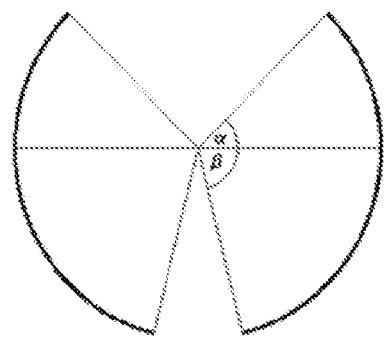
FIG. 4 shows the apertures of the iris' circular arcs.

These arcs, shown in FIG. 4, have an aperture of $\alpha$ and $\beta$ of 50° and 70° respectively, and are obtained from empirical measurements. The iris templates contain these arcs for different radii and face rotations comprising an angle $\phi = \pm 15°$ within the plane.

Figure 5:
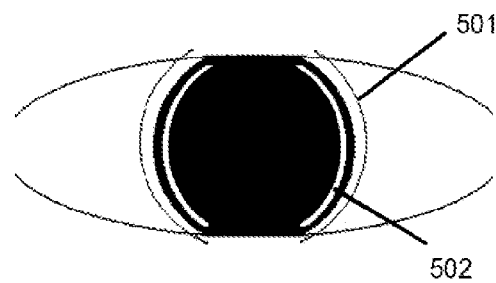
FIG. 5 shows the areas of interest in the iris.

The discrete line integral is then calculated as:

$$\oint_{TI_{\Phi_R}^{(i_0, eye)}} I_n(i,j) \approx \frac{1}{N_{TI_{\Phi_R}}} \cdot \sum_{i,j \in TI_{\Phi_R}^{(i_0, eye)}} I_{eye}(i,j)$$

where $(i_0, j_0)$ is a candidate to be the center point of the iris, and the term $$N_{TI_{\Phi_R}}$$

corresponds to the number of points belonging to the template $$T_{l_{\Phi_R}},$$

and is used for normalization purposes. Two integrals are computed for templates of radius R and R+δ with δ equal to 2 (distance between templates). The ratio between these two integrals will be maximal when the templates associated to each integral are located such that the outer radius R+δ, is in the zone of the sclera, and the internal R is in the zone of the iris. This is illustrated in FIG. 5 where the external template of radius R+δ (501) is in the clear zone of the sclera, and the internal template of radius R (502) is located in the dark area of the iris.

This process is repeated for all points that are candidates to be the center of the iris, coming from the second step of image binarization (302). The line integral calculation is performed on the image from the search zone $I_{eye}$ because it is not filtered, and therefore maintains the precision of the original image. The ratio between the internal and external templates is calculated from the relationship:

$$R_{LI_\Phi}(i_0,j_0) = \frac{\oint T_{l_{\Phi_{R+\delta}(i_0,j_0)}} I_n(i,j)}{\oint T_{l_{\Phi_R(i_0,j_0)}} I_n(i,j)} \forall\, (i_0,j_0) \in I_{iris}$$

Once all possible points that are candidates to be the center of the iris are covered, the coordinates that deliver a maximum $R_{LI\_\Phi}$ ratio is chosen as the center of the iris. This is done with the fourth step in iris center estimation (304) of the iris location step (102). To reduce computations, a relation is empirically defined between the size of the internal template of radius R (502) and face size:

$$R = 0.11 \times \left(\frac{H/2}{2} - 70\right) + 8$$

This relationship holds for faces bigger than 40 pixels high.

If one or both eyes are not detected in the eye detection step (101), the digital image of the frontal face (100) enters the frontal face validation step (103) consisting of the first substep, which is the validation of the face (130), and, if it is a valid face, to the anthropometric estimation of the eyes (603).

Figure 6:
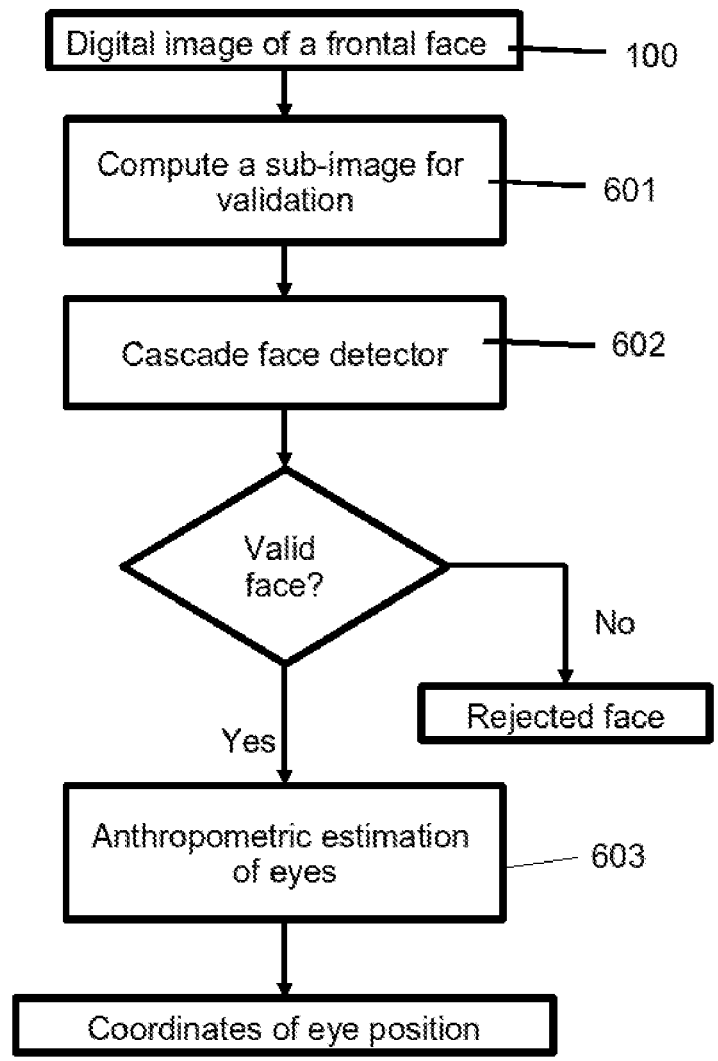
FIG. 6 is a flowchart of the frontal face validation step.

The frontal face validation step (103) is explained in FIG. 6. Based on the frontal face digital input image (100), a subimage (601) is calculated, which is a fraction of the main image and corresponds to a square of side L, where L is equal to 80% of W of the frontal face digital input image (100). The subimage is run through a cascade Adaboost detector (602) to be validated as a face. The Adaboost detector uses Haar features and has been previously trained with images of eyes and nose. Preferably this sub-step is implemented as described in, "Viola P., Jones M., *International Journal of Computer Vision*, Vol. 57, No. 2, 2004, pp. 137-154", though it is also possible to use other implementations such as Adaboost variants or the use of features different from Haar, such as LBP.

Figure 7:
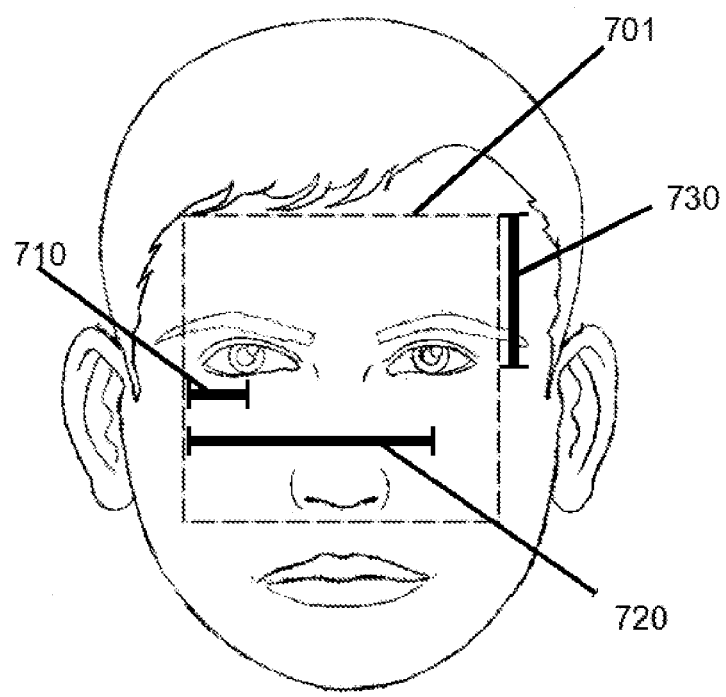
FIG. 7 describes the frontal face coordinates.

FIG. 7 shows the output provided by the cascade detector (602) which is trained with images consisting of the square of side L that contains the eyes and the nose (701). If the cascade detector (602) gives a positive detection, the face is considered valid, otherwise it is rejected and no eye coordinates are delivered. If it is validated, the image of the face along with the coordinates from the cascade detector (602) enter into the anthropometric eye estimate (603) to determine eye position. This implementation allows for an approximate estimate of eye position in case of occlusions, closed eyes, or sunglasses, thereby solving the most common problems encountered by eye detection methods.

The eye position estimate is based on anthropometric tests and measurements and their parameters, as explained in FIG. 7, with the detection of face validation being the reference for the calculation of coordinates A (710), B (720), and C (730), which are defined below:

$$A = 0.21 \times L$$

$$B = 0.83 \times L$$

$$C = 0.54 \times L$$

where L is the size of the detection side delivered by the cascade detector (602). The eye position (coordinates) are thus defined as:

$$(X'_{left}, Y'_{left}) = (B, C)$$

$$(X'_{right}, Y'_{right}) = (A, C)$$

What is claimed is:

1. A digital image processing method for locating eyes on a frontal face digital image, comprising the steps of:
   a) obtaining a digital image of a frontal face, W pixels wide and H pixels high, grayscale, where the top left vertex of the digital image is considered as the reference source;
   b) detecting each eye, starting with a search subimage of the frontal face digital image, delivering approximate coordinates if both eyes have been detected, or an arbitrary predetermined value that indicates no eye detection;
   c) locating the iris of each eye, if both eyes have been detected, starting from the approximate coordinates, validating the frontal face on the digital image providing eye positions; or
   d) validating the frontal face digital image, if one or both eyes have not been detected, calculating a search subimage defined by an area resulting from centering a square of area L on the original image, where L=0.8×W, to deliver the coordinates for the eyes;
   wherein the step of validating the frontal face digital image is comprised of the steps of:
   1) defining a search subimage by an area resulting from centering a square of area L on the original image;
   2) submitting the search subimage to an Adaboost cascade classifier that uses Haar features, which has previously been trained with images that include both eyes and nose; if the output is negative the frontal face input image is rejected; if the output is positive the following steps are executed:
      (i) estimating the left eye coordinates $(X_i, Y_i)$ such that $X_i$ is in position 0.21×L pixels and $Y_i$=0.54×L pixels with respect to the input frontal face image;
      (ii) estimating the right eye coordinates $(X_d, Y_d)$ such that $X_d$ is in position 0.83×L pixels and $Y_d$=0.54×L pixels with respect to the input frontal face image; and
      (iii) delivering the coordinates obtained for each eye $(X_i, Y_i)$ and $(X_d, Y_d)$.

2. The method of claim 1, wherein the digital image is frontal with rotations of ±15° within the plane, and with rotations of ±30° outside of the plane.

3. The method of claim 1, wherein the step of detecting each eye comprises the steps of:
   a) calculating a search subimage for the left eye defined by the area ($W_{left} \times H_{left}$) of the original image, between the coordinates 0.5×W and 0.95×W pixels on its horizontal side, and between the coordinates 0.05×H and 0.5×H pixels on its vertical side;
   b) calculating a search subimage for the right eye defined by the area ($W_{right} \times H_{right}$) of the original image, between the coordinates 0.05×W and 0.5×W pixels on its horizontal side, and between the coordinates 0.05×H and 0.5×H pixels on its vertical side;
   c) calculating a normalization factor Seyes from the width of the search windows $W_{left}$ y $W_{right}$, and a value $U_{eyes}$, preferably 200 pixels, where Seyes=max($W_{left}$;$W_{right}$) $U_{eyes}$;
   d) resizing the subimages calculated with the normalization factor Seyes, using simple linear interpolation, maintaining the aspect ratio;
   e) detecting the eyes by submitting the search subimages to an Adaboost cascade classifier using Haar features, that has been previously trained with images of eyes and "not eyes", obtaining the approximate coordinates for each eye or an arbitrary predetermined value that indicates that there is no eye detection and therefore the face is not valid; and
   f) transforming the approximate coordinates for the eyes to the original reference system, W×H pixels, giving rise to the coordinates ($X'_{left}$;$Y'_{left}$) and ($X'_{right}$;$Y'_{right}$), respectively.

4. The method of claim 3, wherein the normalization factor is applied as:

$$X'_{left} = X_{left} \times Seyes + 0.5 \times W$$

$$Y'_{left} = Y_{left} \times Seyes + 0.5 \times H$$

$$X'_{right} = X_{right} \times Seyes + 0.05 \times W$$

$$Y'_{right} = Y_{right} \times Seyes + 0.5 \times H,$$

where:
   ($X'_{left}$; $Y'_{left}$) are the coordinates for the left eye relative to the frontal face input image;
   ($X'_{right}$; $Y'_{right}$) are the coordinates for the right eye relative to the frontal face input image; and
   ($X_{left}$; $Y_{left}$) and ($X_{right}$; $Y_{right}$) are the coordinates for the left and right eye delivered from the cascade eye detection step.

5. The method of claim 1, wherein the step of locating the iris of each eye comprises the steps of:
   a) calculating an iris search radius $R_{eyes}$ as a function of the distance between the approximate eye positions on the input image;
   b) calculating a search subimage for the left eye whose upper left vertex is located at ($X'_{left}-R_{eyes}$, $Y'_{left}-R_{eyes}$) and lower right vertex at ($X'_{left}+R_{eyes}$, $Y'_{left}+R_{eyes}$) of the original image;
   c) calculating a search subimage for the right eye whose upper left vertex is located at ($X'_{right}-R_{eyes}$, $Y'_{right}-R_{eyes}$) and lower right vertex at ($X'_{right}+R_{eyes}$, $Y'_{right}+R_{eyes}$) of the original image; and
   d) validating the frontal face on the digital image delivering the position of the eyes through the iris coordinates obtained for each eye ($X_i,Y_i$) and ($X_d, Y_d$).

6. The method of claim 5, wherein the process of validating the frontal face in the digital image by delivering the position of both the left eye and the right eye, comprises the steps of:
   b) filtering the search subimage $I_{eye}$ using minimum filtering to generate an image $I_{eyem}$;
   c) binarizing the filtered image $I_{eyem}$ to generate a masked subimage that contains the coordinates for center of iris candidates, where pixels with non-zero values are center of iris candidates;
   d) generating an iris template consisting of four arcs, defined by angular parameters α and β at 50° and 70° respectively, obtained through empirical measurements, with a value of one in the arcs and zero in the rest, where the size of the internal arcs of the iris template is 2R×2R, where R is the radius of the arcs, and is defined as:

$$R = 0.11 \times \left(\frac{H/2}{2} - 70\right) + 8;$$

e) generating an external iris template following the same procedure as in (c), where the radius of the external arcs of the iris template is R+δ, where δ is preferably 2;
   f) computing a line integral value for each iris center candidate pixel, wherein the step of computing the line integral value comprises the steps of:
      (i) aligning the center of the internal iris template with the candidate pixel adding all pixels whose positions match the internal iris template arcs, wherein this sum is performed on the original non-filtered search image ($I_{eye}$), and is defined as a value A;
      (ii) aligning the center of the external iris template arcs with the candidate pixel adding all pixels whose positions match the external iris template arcs, wherein this sum is performed on the original non-filtered search image ($I_{eye}$), and is defined as a value B;
      (iii) calculating the ratio B/A, which is defined as the line integral value for each candidate pixel;
   g) choosing the coordinate with the highest line integral value as the center of the iris in the original search subimage.

* * * * *